United States Patent

[11] 3,595,542

| [72] | Inventor | Neville David Ashman |
| | | Borough Green, England |
| [21] | Appl. No | 773,437 |
| [22] | Filed | Nov. 5, 1968 |
| [45] | Patented | July 27, 1971 |
| [73] | Assignee | Fawkham Developments Limited |
| | | Kent, England |
| [32] | Priority | Nov. 6, 1967 |
| [33] | | Great Britain |
| [31] | | 50350/67 |

[54] PREHEATER USING DOWNWARDLY FLOWING, DIRECTLY CONTACTING, FLUIDIZING VAPORS FROM CALCINING STAGE OF CALCEROUS MATERIAL
11 Claims, 1 Drawing Fig.

[52] U.S. Cl. .................................................. 263/21 A,
263/53, 202/150, 23/1 F, 23/284
[51] Int. Cl. ...................................................... F27b 15/00
[50] Field of Search ........................................... 201/31, 44;
202/121, 150; 34/10, 57; 208/127; 263/21 A, 53;
23/1 F, 284, 288.3 S, 293

[56] References Cited
UNITED STATES PATENTS

| 2,664,338 | 12/1953 | Cornell | 23/288.3 S |
| 2,665,288 | 1/1954 | O'Dell | 23/288.3 S |
| 3,011,953 | 12/1961 | Foch | 201/44 |
| 3,152,005 | 10/1964 | Tuttle | 23/288 |
| 2,658,862 | 11/1953 | Horner | 202/150 X |

*Primary Examiner*—Norman Yudkoff
*Assistant Examiner*—David Edwards
*Attorney*—Haseltine Lake and Company ABSTRACT: This invention relates to a method and apparatus for fluidizing particulate material with a dust-laden gas and to a method and apparatus for calcining granular material in which dust-laden products of combustion from a calciner are used to fluidize and preheat the granular material subsequently delivered to the calciner.

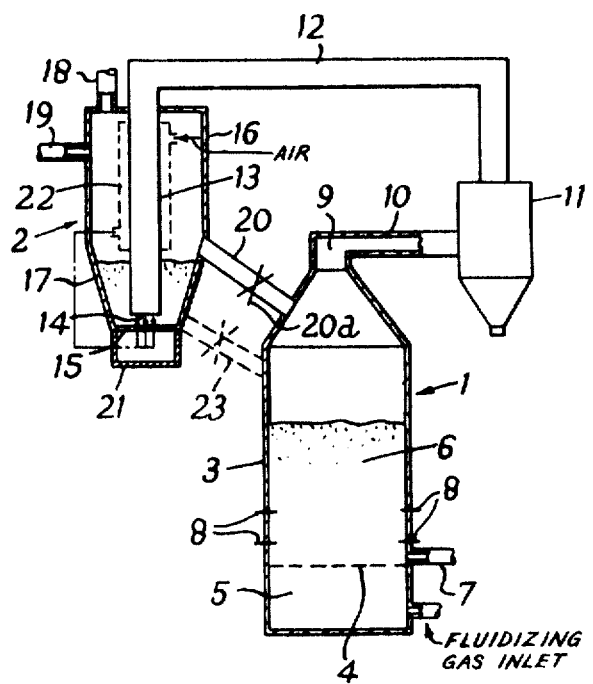

PREHEATER USING DOWNWARDLY FLOWING, DIRECTLY CONTACTING, FLUIDIZING VAPORS FROM CALCINING STAGE OF CALCEROUS MATERIAL

BACKGROUND OF THE INVENTION

This invention relates to a method of and apparatus for fluidizing particulate material. It is particularly although not exclusively concerned with the preheating of granular material to be fed to a calciner.

In the calcining of granular calcareous material it is known to employ a fluidized bed in which fuel is directly burnt. Dust-laden products of combustion leaving the calciner represent an available source of considerable heat energy and it is convenient to dissipate this energy in the preheating of material to be fed to the calciner. The preheating can be carried out particularly efficiently in a fluidized bed. However, when conventional fluidizing techniques are employed with dust-laden products at high temperature passing through a multiplicity of comparatively small apertures to create the fluidized bed clogging of these apertures can quickly take place even when these products are first passed through a cyclone separator. The speed of agglomeration of particles is increased as temperatures increase above about 600° C. and in addition, when sulfur-containing fuels are burned in the calciner, sulfur compounds present in the products of combustion may react with the dust to form sulfates which would increase the buildup referred to.

SUMMARY OF THE INVENTION

It is accordingly an object of the present invention to provide an improved method of and apparatus for fluidizing particulate material with dust-laden gas which is particularly although not exclusively applicable to the preheating of granular material prior to feeding the latter to a calciner.

It is a further object of the present invention to provide an improved method of and apparatus for calcining granular material including a fluidized preheater for the material.

According to one aspect of the present invention there is provided a method of fluidizing particulate material with dust-laden gas comprising injecting the gas into a bed of the material in a downward direction and at a position below the static surface level thereof.

According to another aspect of the present invention there is provided a method of calcining granular material comprising fluidizing a bed of the material with dust-laden combustion products from a calciner in accordance with the immediately preceding paragraph to preheat the material and feeding the preheated material to the calciner.

According to a further aspect of the present invention there is provided apparatus for fluidizing particulate material comprising a vessel having a fluidizing zone at the lower end thereof, first means for injecting fluidizing gas in a downward direction in the lower part of the zone, and further means for injecting fluidizing gas upwardly through the base of the zone at a position in register with said first means.

According to a further aspect of the present invention there is provided apparatus for calcining granular material comprising a calciner and a preheater for material to be fed to the calciner the preheater comprising a vessel having a fluidizing zone at the lower end thereof and means for injecting dust-laden combustion products from the calciner in a downward direction within the zone.

BRIEF DESCRIPTION OF THE DRAWINGS

The above and other aspects of the present invention will now be described by way of example with reference to the single FIGURE of the accompanying drawing which shows diagrammatically a calcining apparatus.

DESCRIPTION OF THE PREFERRED EMBODIMENTS

Referring to the drawing the apparatus comprises a single fluidized bed calciner 1 and a fluidized bed preheater 2. The calciner 1 comprises a cylindrical vessel 3 partitioned towards its lower end by a perforated plate 4 the space 5 below the plate constituting a plenum chamber for fluidizing air and the space 6 above the plate constituting a fluidizing zone for material to be calcined. A material outlet 7 is provided just above the plate 4 and a number of fuel burners the positions of which are indicated at 8 pass through the wall of the vessel in the lower part of the zone 6.

The upper part of the vessel 3 is tapered and is provided with a combustion product outlet 9 connected via a duct 10 with a cyclone separator 11. The upper part of the separator 11 is connected by a duct 12 with the upper end of a tube 13 extending downwardly through the preheater 2, the open lower end 14 of the tube being near the base 15 of the preheater. The latter comprises a generally cylindrical vessel 16 the lower part 17 of which is inwardly tapered to meet the wall 15 and constitutes a fluidizing zone.

The vessel 16 has a granular material inlet 18 in its upper part a gas outlet 19 towards its upper end and at the top of the lower part 17 a passage 20 for passing preheated material to the upper part of the calciner.

The passage is fitted with a valve 20a to regulate the flow of material from the preheater to the calciner and maintain a gas seal.

The operation of the calciner 1 is well known for calcareous material and will not be specifically described. Dust-laden products of combustion from the vessel 3 pass to the cyclone separator 11 which can be utilized to extract therefrom commercially useable particles but the gaseous output from the cyclone separator still has a considerable quantity of dust entrained therein and is at a high temperature since the operating temperature of the calciner is likely to be of the order of 900°—1000° C. Granular material to be preheated before calcining is fed into the vessel 16 through the inlet 18 to constitute a bed in the lower part 17 thereof. This bed is fluidized with dust-laden combustion products from the calciner passing down through the tube 13. Very efficient heat transfer can be obtained in a fluidized bed and accordingly much of the heat content of the combustion products from the calciner can be usefully extracted in this preheating operation. Granular material is fed through the inlet 18 at a rate suitable to enable an appropriate delivery of preheated material through the valve-controlled passage 20 to the calciner 1. It will be understood that the lower open end 14 of the tube 13 constitutes an injection point in a downward direction for the dust-laden combustion products and that it must be disposed below the static level of the bed in the lower part 17 of the preheater 2. In practice the open end 14 is arranged to be near the base 15 of the vessel 16.

With this arrangement and since fluidizing gas does not pass through a multiplicity of comparatively small apertures, clogging is obviated notwithstanding its considerable dust content. It is expected that the temperature of the dust-laden combustion products passing through the tube 13 will be the order of 950° C. and that the temperature of the products exhausted from the preheater 2 through the outlet 19 will be of the order of 500° C.

Depending upon the operating conditions of the apparatus and the particular nature of the dust content entrained in the combustion products from the calciner, there may be found to be a quantity of dust which tends to agglomerate on the upper surface of the base 15 opposite the lower open end of the tube 13. In this event, at least this part of the base 15 may be perforated with a plenum chamber 21 arranged therebelow and clean air under pressure may be supplied to the plenum chamber to pass upwardly through the perforations to fluidize this material and prevent this undesirable buildup of dust. With this modified arrangement, it is desirable that the clean air supplied to the chamber 21 shall itself be preheated and this may conveniently be effected by passing it through a jacket 22 surrounding the upper part of the tube 13 above the fluidizing zone within the lower part 17 of the chamber 16. This jacket also serves to reduce the heat lost by radiation from the tube 13 to outgoing gases from the preheater.

It will be appreciated that the cyclone separator 11 will be used only when commercially useful material may be extracted from the dust entrained in the combustion products from the calciner 1. In addition, in view of the excellent heat transfer property of a fluidizing bed, the granular material fed to the preheater through the inlet 18 may have a considerable water content. Such water content may be, for example, up to 15 percent.

Although the preheater 2 and the tube 13 may be cylindrical it will be understood that the duct 12 may be joined to a horizontally extending manifold (not shown) with a horizontally elongated tube depending therefrom and extending into a generally rectangular preheater vessel.

Furthermore although the passage 20 has been shown communicating with the top of the lower part 17 it will be understood that it could communicate with the preheater vessel at a position nearer the base 15 as shown in dotted lines 23. With the arrangement shown in the drawing material from the preheater 2 overflows into the calciner and the valve 20a is necessary to prevent undesirable gaseous passage, from the calciner to the preheater. With the modified arrangement material passes to the calciner under gravity and the valve 20a is necessary to control the flow of this material.

I claim:

1. In a method of calcining calcareous granular material in a vessel with a fluidized bed, an improvement comprising withdrawing gaseous combustion products from the vessel, injecting said gaseous combustion products downwardly from the lower open end of a tube into a second bed of granular material to be subsequently calcined at a level below the static surface level of the second bed to fluidize said second bed and provide heat exchange between said material in said second bed and said gaseous combustion products, conveying the now heated granular material from said second bed into the calcining vessel and calcining the heated granular material in the fluidized bed in the calcining vessel.

2. An improvement as claimed in claim 1 wherein said gaseous combustion products are passed through a horizontally extending manifold to said tube which depends therefrom, the tube extending into a vessel, the lower part of which constitutes the fluidizing zone.

3. An improvement as claimed in claim 2, comprising blowing a second gas upwardly in said vessel through a bottom perforated portion thereof facing the open end of the tube to prevent buildup on the bottom of the vessel of dust contained in the gaseous combustion product.

4. An improvement as claimed in claim 3, comprising heating the second gas before blowing it upwardly in the vessel by preliminarily contacting the second gas with the tube.

5. An improvement as claimed in claim 4, wherein the second gas is heated by being passed through a heat exchanger on said tube and contained within said vessel.

6. An improvement as claimed in claim 3, wherein said second gas is air.

7. In an apparatus for calcining granular material in a calcining calcareous vessel with a fluidized bed, an improvement comprising outlet means for withdrawing gaseous combustion products from the calcining vessel, a preheater vessel containing a second bed of granular material to be subsequently calcined, a vertical tube in said preheater vessel having an open lower end at a level below the static surface of the second bed, means connecting said tube and said outlet means to cause said gaseous combustion products to flow directly into said second bed and produce fluidization thereof and consequent heat transfer therewith, and means for conveying the now heated granular products in said preheater vessel into the calcining vessel.

8. An improvement as claimed in claim 7 comprising means for injecting a second gas upwardly in said preheater vessel at the bottom thereof and in registry with the open lower end of the tube to prevent dust accumulation at said bottom of the preheater vessel.

9. An improvement as claimed in claim 7, wherein said preheater vessel is cylindrical with an inwardly tapered lower portion constituting a fluidizing zone.

10. An improvement as claimed in claim 7, wherein said preheater vessel includes a lower wall with a perforated portion beneath the open lower end of the tube, and a plenum chamber beneath said lower wall.

11. An improvement as claimed in claim 10, comprising a heat exchanger on said tube in said preheater vessel, and means for passing gas through said heat exchanger and into said plenum chamber for passage of the thus heated gas through said perforated portion and into said second bed.